(12) United States Patent
May et al.

(10) Patent No.: US 12,150,827 B2
(45) Date of Patent: Nov. 26, 2024

(54) TOOTHBRUSH

(71) Applicant: Quip NYC Inc., Brooklyn, NY (US)

(72) Inventors: William Thomas May, South Orange, NJ (US); Simon Enever, Brooklyn, NY (US)

(73) Assignee: QUIP NYC INC., Brooklyn, NY (US)

( * ) Notice: Subject to any disclaimer, the term of this patent is extended or adjusted under 35 U.S.C. 154(b) by 662 days.

(21) Appl. No.: 17/062,275

(22) Filed: Oct. 2, 2020

(65) Prior Publication Data

US 2021/0145557 A1 May 20, 2021

Related U.S. Application Data

(63) Continuation of application No. 14/522,805, filed on Oct. 24, 2014, now Pat. No. 10,792,136.

(60) Provisional application No. 61/895,593, filed on Oct. 25, 2013.

(51) Int. Cl.
*A61C 17/22* (2006.01)
*A46B 15/00* (2006.01)
*A61C 17/34* (2006.01)

(52) U.S. Cl.
CPC ........ *A61C 17/221* (2013.01); *A46B 15/0004* (2013.01); *A61C 17/34* (2013.01); *A61C 17/3481* (2013.01)

(58) Field of Classification Search
CPC ..... A46B 15/004; A61C 17/221; A61C 17/34; A61C 17/3481
See application file for complete search history.

(56) References Cited

U.S. PATENT DOCUMENTS

| | | | |
|---|---|---|---|
| 1,444,368 | A | 2/1923 | Conley |
| 1,506,257 | A | 8/1924 | Schmidt |
| 1,899,242 | A | 2/1933 | McNab |
| 2,112,658 | A | 3/1938 | Rathbun |
| 2,177,504 | A | 10/1939 | Thompson |
| 2,227,541 | A | 1/1941 | Groff |
| 2,278,365 | A | 3/1942 | Daniels |
| 2,725,270 | A | 11/1955 | Lewis |
| 3,088,148 | A | 5/1963 | Moret |
| 3,181,189 | A | 5/1965 | Leyden |
| 3,369,265 | A | 2/1968 | Halberstadt et al. |

(Continued)

FOREIGN PATENT DOCUMENTS

| | | |
|---|---|---|
| CN | 1523973 | 8/2004 |
| CN | 1638702 | 7/2005 |

(Continued)

OTHER PUBLICATIONS

Supplementary European Search Report dated Jul. 21, 2017 for European Patent Application No. EP 14855952.

(Continued)

*Primary Examiner* — Shay Karls
(74) *Attorney, Agent, or Firm* — ArentFox Schiff LLP (57) ABSTRACT

A toothbrush, including a head portion, a handle portion, a locking mechanism configured to lock said head portion to said handle portion, a capsule including a motor assembly and power supply, the capsule being configured to be received within said handle portion, and at least one communication connection configured to enable said toothbrush to communicate with one or more external computing devices.

6 Claims, 8 Drawing Sheets

(56) References Cited

U.S. PATENT DOCUMENTS

| | | |
|---|---|---|
| 3,400,417 A | 9/1968 | Moret |
| 3,699,952 A | 10/1972 | Waters |
| 3,977,743 A | 8/1976 | Harris |
| 4,070,735 A | 1/1978 | Canaday |
| 4,697,949 A | 1/1987 | Perez |
| D309,375 S | 7/1990 | Ahlstroem et al. |
| 5,044,039 A | 9/1991 | Picard |
| D324,455 S | 3/1992 | Fasitta et al. |
| 5,505,301 A | 4/1996 | Foley |
| 5,742,971 A | 4/1998 | Salinger |
| 5,779,046 A | 7/1998 | Plakos |
| 5,875,510 A | 3/1999 | Lamond |
| 5,974,615 A | 11/1999 | Schwarz-Hartmann |
| 6,015,328 A | 1/2000 | Glaser |
| 6,026,532 A | 2/2000 | Catanzaro |
| 6,049,936 A | 4/2000 | Holley |
| 6,076,223 A | 6/2000 | Dair |
| 6,081,957 A | 7/2000 | Webb |
| 6,237,178 B1 | 5/2001 | Krammer |
| 6,237,183 B1 | 5/2001 | Fischer |
| 6,546,585 B1 | 4/2003 | Blaustein et al. |
| 6,685,375 B1 | 2/2004 | Crocker |
| 6,709,185 B2 | 3/2004 | Lefevre |
| 6,731,213 B1 | 5/2004 | Smith |
| 6,779,216 B2 | 8/2004 | Davies |
| 6,799,346 B2 | 10/2004 | Jeng |
| 6,821,119 B2 | 11/2004 | Shortt |
| 6,836,917 B2 | 1/2005 | Blaustein |
| 6,895,625 B2 | 5/2005 | Lev |
| 7,600,284 B2 | 10/2009 | Hui |
| 7,636,977 B2 | 12/2009 | Banning |
| 7,917,986 B2 | 4/2011 | Jimenez |
| D660,002 S | 5/2012 | Smigel et al. |
| 8,337,213 B2 | 12/2012 | Puurunen et al. |
| 9,168,117 B2 | 10/2015 | Yoshida |
| D762,986 S | 8/2016 | May et al. |
| 9,427,293 B2 | 8/2016 | Haynes et al. |
| 11,246,403 B2 | 2/2022 | May et al. |
| D950,958 S | 5/2022 | Ji et al. |
| D957,822 S | 7/2022 | Jungnickel et al. |
| D959,843 S | 8/2022 | Jungnickel et al. |
| D994,348 S | 8/2023 | Zhu |
| D1,019,149 S | 3/2024 | May et al. |
| 2002/0124864 A1 | 9/2002 | Gross |
| 2003/0070998 A1 | 4/2003 | Bulka |
| 2003/0135940 A1 | 7/2003 | Lev |
| 2003/0166373 A1 | 9/2003 | Whitney |
| 2005/0217456 A1 | 10/2005 | Hodesh |
| 2006/0040246 A1 | 2/2006 | Ding |
| 2006/0104456 A1 | 5/2006 | Filo |
| 2006/0207043 A1 | 9/2006 | Yamamoto |
| 2006/0279896 A1 | 12/2006 | Bruwer |
| 2007/0050931 A1 | 3/2007 | Jimenez et al. |
| 2007/0256262 A1 | 11/2007 | Moss |
| 2008/0109973 A1 | 5/2008 | Farrell et al. |
| 2008/0113150 A1 | 5/2008 | Lee |
| 2008/0311282 A1 | 12/2008 | Hammon |
| 2009/0064429 A1 | 3/2009 | Hall |
| 2009/0081610 A1 | 3/2009 | Hayman et al. |
| 2009/0291422 A1 | 11/2009 | Puurunen |
| 2009/0293211 A1 | 12/2009 | Spungin |
| 2009/0313773 A1* | 12/2009 | Filsouf ............... A61C 17/3472 15/22.1 |
| 2009/0313801 A1 | 12/2009 | Jimenez |
| 2010/0281636 A1 | 11/2010 | Ortins |
| 2011/0010876 A1 | 1/2011 | Iwahori et al. |
| 2011/0081624 A1 | 4/2011 | Chronister et al. |
| 2012/0192367 A1 | 8/2012 | Lin |
| 2012/0246846 A1 | 10/2012 | Hall |
| 2012/0266397 A1 | 10/2012 | Iwahori |
| 2013/0101300 A1 | 4/2013 | Weisser et al. |
| 2013/0180062 A1 | 7/2013 | Huy |
| 2014/0259469 A1 | 9/2014 | Garrigues |
| 2021/0045557 A1 | 2/2021 | Crouch |

FOREIGN PATENT DOCUMENTS

| | | |
|---|---|---|
| CN | 101316564 A | 12/2008 |
| CN | 102036581 | 4/2011 |
| CN | 102883678 | 1/2013 |
| CN | 202959285 | 6/2013 |
| CN | 103188966 B | 1/2016 |
| GB | 9002453472 | 4/2014 |
| JP | 2010184489 | 8/2010 |
| WO | WO-2006003598 | 1/2006 |
| WO | 201140008 A1 | 4/2011 |
| WO | 2013009751 A1 | 1/2013 |
| WO | WO-2013101300 | 7/2013 |

OTHER PUBLICATIONS

International Preliminary Report on Patentability dated Apr. 26, 2016 for International Application No. PCT/US2014/062113.
International Search Report dated Feb. 6, 2015 for International Application No. PCT/US2014/062113.
National Intellectual Property Administration, PRC, "Notification of the Third Office Action," issued in related Chinese Patent Application No. 2021108973216, dated May 10, 2023, and English Language Translation Summary (9 pages).
U.S. Patent and Trademark Office, "Non-Final Office Action," issued in related U.S. Appl. No. 14/522,805 dated Apr. 20, 2017 (13 pages).
U.S. Patent and Trademark Office, "Non-Final Office Action," issued in related U.S. Appl. No. 14/522,805 dated Jan. 25, 2018 (14 pages).
U.S. Patent and Trademark Office, "Final Office Action," issued in related U.S. Appl. No. 14/522,805 dated Nov. 1, 2018 (13 pages).
U.S. Patent and Trademark Office, "Non-Final Office Action," issued in related U.S. Appl. No. 14/522,805 dated May 31, 2019 (19 pages).
U.S. Patent and Trademark Office, "Final Office Action," issued in related U.S. Appl. No. 14/522,805 dated Mar. 5, 2020 (22 pages).
U.S. Patent and Trademark Office, "Notice of Allowance," issued in related U.S. Appl. No. 14/522,805 dated Aug. 21, 2020 (6 pages).
U.S. Patent and Trademark Office, "Non-Final Office Action," issued in related U.S. Appl. No. 16/518,394 dated Jun. 14, 2022 (8 pages).
U.S. Patent and Trademark Office, "Final Office Action," issued in related U.S. Appl. No. 16/518,394 dated Jun. 2, 2023 (24 pages).
China National Intellectual Property Administration, "Decision on Re-examination," issued in related Chinese Patent Application No. 2014800587131, dated May 12, 2021, including English-language translation (18 pages).
China National Intellectual Property Administration, "Notice of Re-examination," issued in related Chinese Patent Application No. 2014800587131, dated Jan. 11, 2021, including English-language translation (13 pages).
China National Intellectual Property Administration, "Decision on Rejection," issued in related Chinese Patent Application No. 2014800587131, dated Aug. 7, 2019, including English-language translation (11 pages).
China National Intellectual Property Administration, "Notification of First Office Action," issued in related Chinese Patent Application No. 2014800587131, dated Mar. 23, 2017, English-language Translation Only (6 pages).
China National Intellectual Property Administration, "Preliminary Examination," issued in related Chinese Patent Application No. 2014800587131, dated May 23, 2016 (1 page).
China National Intellectual Property Administration, "Notification of Second Office Action," issued in related Chinese Patent Application No. 2014800587131.
China National Intellectual Property Administration, "Notification of Third Office Action," issued in related Chinese Patent Application No. 2014800587131, dated Feb. 3, 2019, including English-language Translation (13 pages).
China National Intellectual Property Administration, "Notification of First Office Action," issued in related Chinese Patent Application No. 2021108973216, dated May 27, 2022, including English-language translation (12 pages).

(56) References Cited

OTHER PUBLICATIONS

China National Intellectual Property Administration, "Notification of Second Office Action," issued in related Chinese Patent Application No. 2021108973216, dated Jan. 5, 2023, including English-language translation (13 pages).
National Intellectual Property Administration, PRC, "Notification of the Third Office Action," issued in related Chinese Patent Application No. 2021108973216, dated May 10, 2023, including English Language Translation Summary (9 pages).
European Patent Office, "Notice of Allowance," issued in related European Patent Application No. 14 855 952.9-1126, dated May 17, 2018. (7 pages).
European Patent Office, "Decision to Grant," issued in related European Patent Application No. 14 855 952.9-1126, dated Aug. 23, 2018 (2 page).
The International Bureau of WIPO, "International Preliminary Report on Patentability," issued in related International Patent Application No. PCT/US2014/062113, dated Apr. 26, 2016 (8 pages).
The U.S. Patent and Trademark Office, "Notice of Allowance," issued in related U.S. Appl. No. 29/808,536, dated Nov. 1, 2023 (9 pages).
United States Patent Office, "Non-Final Office Action," issued in related U.S. Appl. No. 16/518,394 dated May 14, 2021 (11 pages).
United States Patent and Trademark Office, "Final Office Action," issued in related U.S. Appl. No. 16/518,394 dated Jan. 24, 2022 (9 pages).
United States Patent Office, "Non-Final Office Action," issued in related U.S. Appl. No. 16/518,394 dated Mar. 14, 2024 (33 pages).
European Patent Office, "Intention to Grant," issued in related European Patent Application No. 14855952.9 dated May 17, 2018 (7 pages).
U.S. Patent and Trademark Office, "Notice of Allowance and Fee(s) Due," issued in related U.S. Appl. No. 29/808,536, dated Nov. 1, 2023 (9 pages).

* cited by examiner

TOOTHBRUSH

RELATED APPLICATION INFORMATION

The present application is a continuation of and claims priority to U.S. patent application Ser. No. 14/522,805 to May et al, filed Oct. 24, 2014 and entitled "Toothbrush", which claims priority to U.S. Provisional Patent Appl. No. 61/895,593, filed on Oct. 25, 2013, and incorporates their disclosures herein by reference in their entireties.

BACKGROUND

Technical Field

The present invention relates to toothbrushes; and more particularly to the addition of novel features to a toothbrush, including customization of the exterior for utility and aesthetic appeal, customizable motor modes, and convenient storage capacity.

Description of the Related Art

In the field of oral care toothbrushes, there exists a great variety of industrial design styles and aesthetics among both electric and non-electric toothbrushes. A great many styles are too distinctly shaped, or are colored in a garish manner, and do not conform to preferences for style for all users. As such, it would be advantageous to allow a user to give their toothbrush a custom design to fit their individual needs or preferences. Such custom designs may enable, for example, a better grip during the actual brushing action, or they may have a visual design that is aesthetically pleasing to a particular user.

Similarly to the problem of the above-mentioned design of conventional toothbrushes, the modes of operation of conventional electric toothbrushes offer limited options for user customization. A conventional electric toothbrush typically offers a single button to turn on and off the vibratory motor inside the toothbrush. It is common for electric toothbrushes, once activated with their main switch, to remain "on" (e.g., motor activated) for a predetermined amount of time. After the predetermined amount of time has passed, a timer inside the toothbrush will switch the toothbrush motor off and return the toothbrush to an "off" (e.g., motor not activated) state. This function is to enable a toothbrush to inform the user that he or she has brushed their teeth for the appropriate amount of time and may now stop. Because some users may prefer a longer or shorter period of brushing their teeth than the typically recommended amount of time, it would be advantageous for the user to be able to customize the default time period for the timer inside the toothbrush.

In conventional toothbrushes, during the period in which the toothbrush is "On", the vibratory motor may pause or pulse its action to indicate a pre-specified period of time has passed. This period of time is typically 30 seconds, and it indicates to the toothbrush user that they should switch from the front of their teeth to the back or from the bottom row of teeth to the top row of their teeth. This interval period of time is not user-defined and therefore might not align with a desired brushing duration for all users. It would be advantageous for the user to be able to set the reminder interval duration so as to effectively brush their teeth the appropriate amount of time that each individual user deems necessary.

Conventional electric toothbrushes may offer one or two motor speed levels in order to suit the user's preference for vibratory strength. These motor speeds are typically set as an intermediate step in-between the standard on-off cycle. The user, by pressing the toothbrush's main switch once, may turn the motor on to its standard speed. By pressing the main switch again, the user may engage the motor into either the high or low RPM speed for either high or low vibratory strength. A third press of the main switch may turn off the motor entirely. This method of operation involves a less than optimal user interface since a user may prefer only one single motor speed and may want that motor speed to be an predetermined Revolutions Per Minute (RPM) value that corresponds to their exact preference for vibratory strength. It would be advantageous to allow a user to set a single default speed for the motor from a plurality of speeds when the toothbrush's main switch is pressed.

Conventional electric toothbrushes also typically have a single main switch for operating the motor. This switch may be pushed or indented by the user's finger in order to activate the electric motor on and off. However, the experience of using a toothbrush may be advantageously improved by enabling a toothbrush to turn its motor on automatically once the user begins to brush his/her teeth, thereby requiring fewer direct inputs from the user.

In order for a mechanical switch to function, there are moving parts that actuate the electrical connections that power the motor (e.g., vibratory motor in an electric toothbrush). These moving parts may create a weakness in the design of a product that must remain sealed from the intrusion of water. If water, oils, toothpaste scum, etc. were to infiltrate the interior of a toothbrush motor, the motor would cease to function properly. A more secure system for actuating a toothbrush's vibratory motor than pressing a switch (as in conventional electric toothbrushes) may be to allow for a non-mechanical or motion-based switch to actuate the motor and turn the toothbrush to the "on" state. Such a touch-less solution would advantageously reduce the number of parts needed for construction, and allow for improved sealing against water and other environmental contaminants.

A typical storage place for a toothbrush is the bathroom sink, and the surfaces in that environment may not always allow for easy storage of the toothbrush when it is not being used. Whether through a scarcity of space on the sink counter, or to reduce the appearance of clutter, it would be advantageous for a user to store the toothbrush on a vertical surface. Mounting the toothbrush on a vertical surface would allow for the brush to drip dry away from contaminating germs and bacteria, reduce space used on the counter, and allow for a more neat and organized bathroom storage arrangement for users.

It is advantageous for a toothbrush to be vertically standing on a sink counter for many of the same reasons that it is advantageous for the toothbrush to be mounted on a vertical surface (e.g., a vertically standing toothbrush uses less space on a sink counter than a toothbrush lying prone, the positioning of the toothbrush may prevent contamination from germs on the counter surface, it provides for a more organized bathroom storage arrangement, etc.).

SUMMARY

A toothbrush, including a head portion, a handle portion, a locking mechanism configured to lock said head portion to said handle portion, said handle portion being removable and replaceable with a different handle portion of a different design; and a capsule including a motor assembly and power supply, the capsule being configured to be received within said handle portion.

A toothbrush, including a head portion, a handle portion, a locking mechanism configured to lock said head portion to said handle portion, a capsule including a motor assembly and power supply, the capsule being configured to be received within said handle portion, and at least one communication connection configured to enable said toothbrush to communicate with one or more external computing devices.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided for brushing teeth using a toothbrush with various novel features according to the present principles. One novel feature is a design which enables for easy customization of the toothbrush exterior (e.g., for utility or aesthetic appeal through a replaceable handle or skin). Another novel feature is user customizable motor modes which may allow the default operation to be changed according to user specifications for various features (e.g., Revolutions Per Minute (RPM), vibration duration, reminder vibrations, gesture control, etc.). To allow the user more convenient storage and access of the toothbrush, a micro-suction tape may be included on the toothbrush or its cap to enable the toothbrush to be mounted on any smooth surface.

A non-mechanical touch sensor may be included to enable the user to operate the motor and modes of operation of the toothbrush with greater reliability, fewer moving parts, and a greater resistance to water permeating the electric motor cavity. Furthermore, the various embodiments of the present toothbrush system may also enable the novel features of customizability, mountability, and touchless control. The features relating to the customizability of the toothbrush system according to the present principles may address the preference of a user for a product which uniquely suits his/her specific and particular criteria for aesthetic, ergonomic, and functional qualities.

It is noted that the present description illustrates a toothbrush according to the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

Figure 1:
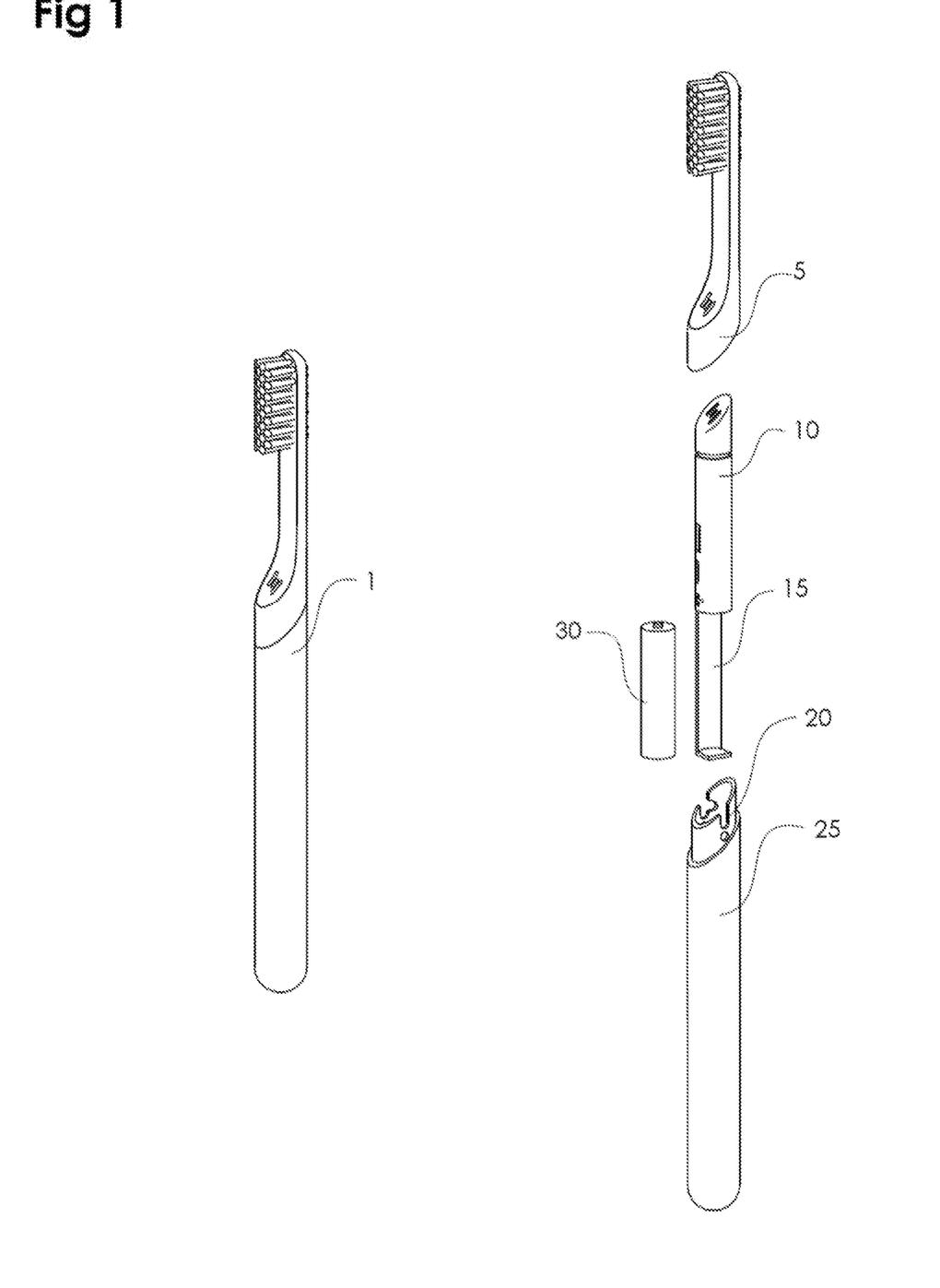
FIG. 1 is a diagram illustrating a perspective and an exploded view of a toothbrush in accordance with the present principles.

Referring now to FIG. 1, a perspective and an exploded view of a toothbrush 1 is illustratively depicted in accordance with the present principles. In one embodiment, a novel feature of the toothbrush 1 is the modular design which may enable easy and low cost replacement of parts and/or to maximize user customization options. By reducing the cost and difficulty of both manufacture and installation, and by enabling users to customize their individual toothbrush with custom parts (e.g., bought or made themselves), users may choose parts that are ergonomically comfortable, and aesthetically pleasing to each individual user, and enable low cost maintenance, replacement of parts, and manufacturing.

In one embodiment, an assembled toothbrush 1 is illustratively depicted according to the present principles. An exploded version of the assembled toothbrush 1 is also depicted, and includes a head 5, a handle 25, a motor assembly 10, and a battery 30. The motor assembly 10 and battery 30 may be affixed together through the motor assembly's battery armature 15. The combined motor assembly 10 and battery 30 may then be placed inside the handle 25 and/or head 5, and the two remaining parts (e.g., handle 25, head 5) may securely connect to each other through a locking mechanism 20.

If the user wishes to purchase and/or install a separate custom version of the handle 25 with a unique shape, color, or design, then they may purchase and replace only that part (e.g., handle 25) on their toothbrush, which reduces the cost of customizing the toothbrush 1 by changing the design of the toothbrush 1 easily without the use of tools.

The separation of the toothbrush 1 into four smaller, modular parts that are easily disassembled significantly reduces the cost of replacing the handle 25 or the head 5, and increases the ease of replacing parts of the toothbrush in order to customize the design. This embodiment's design also reduces manufacturing costs by minimizing the number of parts and assembly needed by the factory during production. The handle 25 is also designed to be of simple geometry so that users inexperienced with three dimensional (3D) design software may be able to easily modify the external shape and appearance to suit their particular desire for function or aesthetics.

In one embodiment, the motor assembly 10 and battery 30 may not be included, and may be optional parts of the toothbrush 1. As the head 5 and handle 25 are able to connect to each other securely using the locking mechanism 20, they are able to act by themselves (e.g., without a motor or battery) as a fully capable, non-electric toothbrush. The inclusion of the motor assembly 10 and battery 30 is optional in this embodiment, and may be added at a later time, or not at all, depending on the preferences of a particular user.

It is noted that a user may upgrade his/her toothbrush by purchasing and installing, without the use of tools, the motor assembly 10 and battery 30 separately to improve the functionality of their toothbrush 1 to include the electric vibratory motor feature. Additionally, it is noted that if the motor assembly 10 is damaged or becomes dysfunctional, it is possible to replace only that part, without requiring the use of tools, which reduces costs (e.g., the cost of maintenance for the user, the cost of warranty for the manufacturer, etc.), and enables simple repair and replacement by a user.

Figure 2:
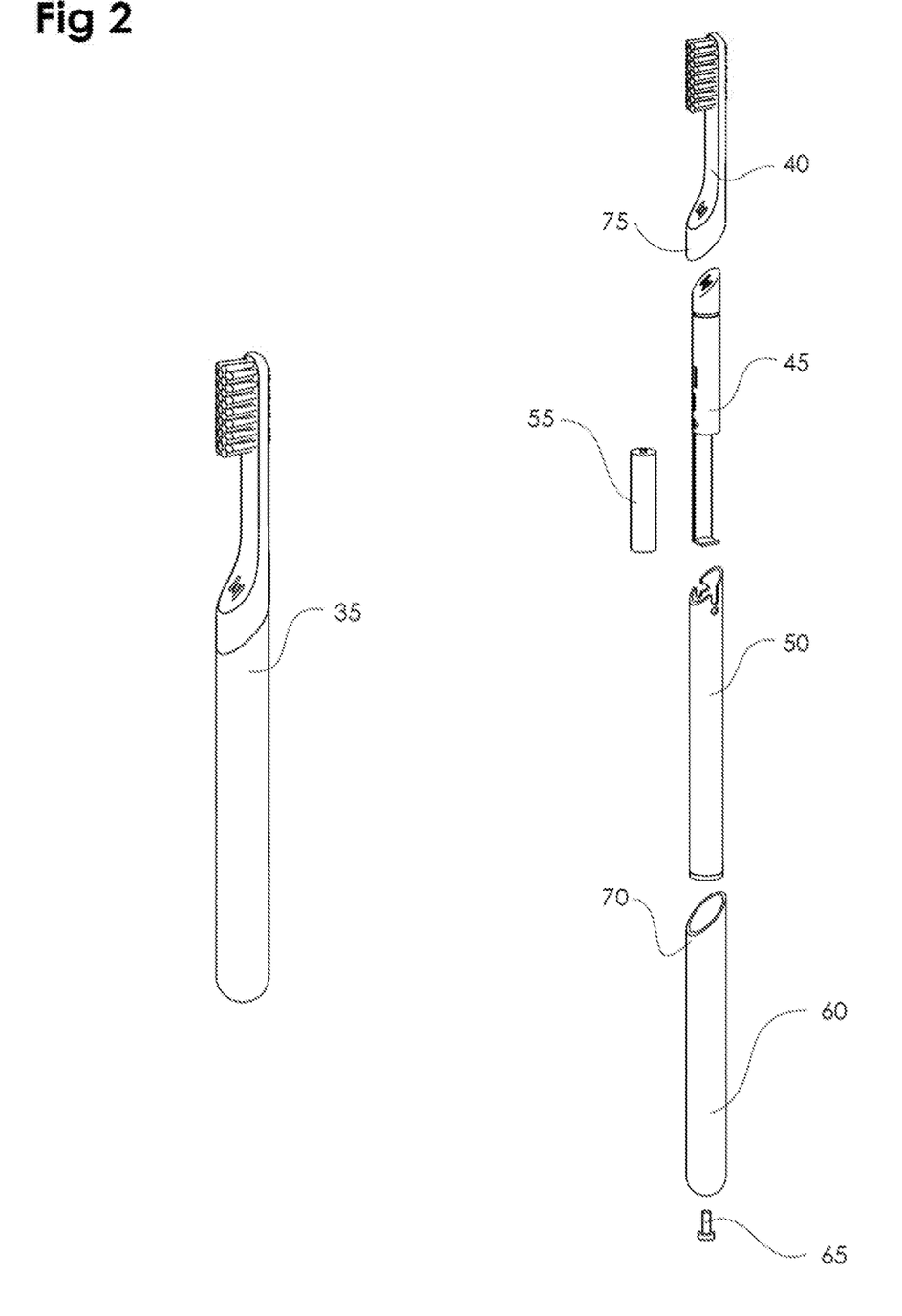
FIG. 2 is a diagram illustrating a perspective and an exploded view of a toothbrush in accordance with the present principles.

Referring now to FIG. 2, a perspective and an exploded view of a toothbrush 35 is illustratively depicted according to one embodiment of the present principles. In this embodiment, the modular construction may include a head 40, a handle 50, a motor assembly 45, a battery 55, a skin 60, and a screw 65. The skin 60 may fit over the handle 50, and may be secured into place by a screw 65. The head 40 may snap onto the handle 50 and the outer surface of the head 75 may be flush with the outer surface of the skin 70. By having the separate, replaceable part skin 60 only consist of the outermost layer of the toothbrush 35 which may be held by the user, the part size and volume of the part is greatly reduced, thereby reducing production costs from that of conventional toothbrushes. It is noted that by reducing the part size and volume, the material cost of producing custom versions of the part through, for example, injection molding, Computer Numerical Control (CNC) machining, Three Dimensional (3D) printing, or any other production method, is greatly reduced.

The skin 60 may include simple geometry to ensure that all users (e.g., from novice to experienced) of 3D design software are able to easily modify the external shape and appearance to suit their particular preferences for function and/or aesthetics. It is noted that this embodiment may exclude the motor assembly 45 and battery 55 to reduce manufacturing cost and/or offer a relatively inexpensive, simple, non-electric version of the toothbrush 35 to users.

Figure 3:
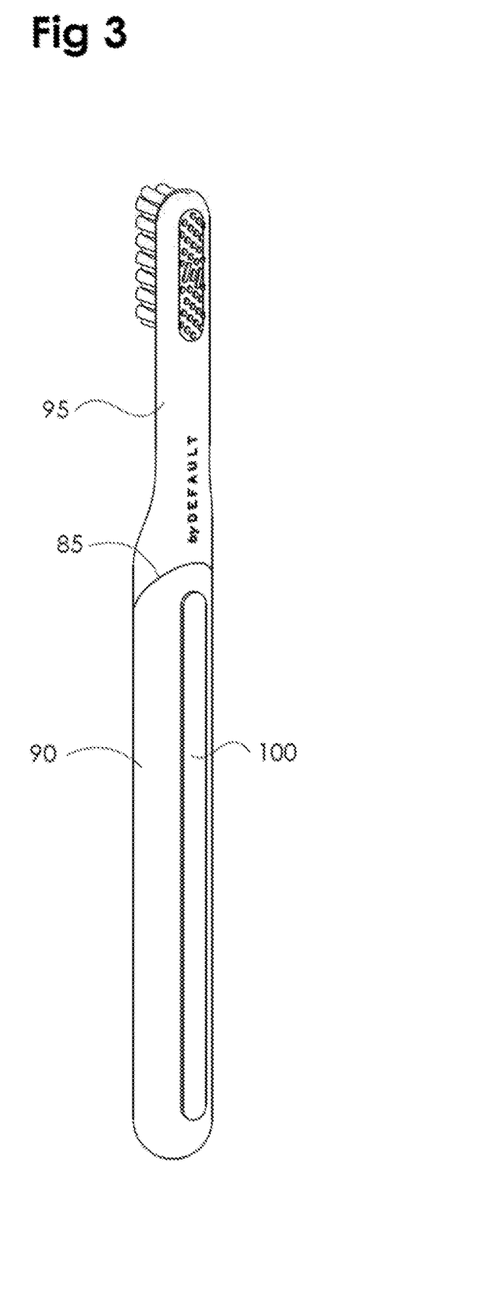
FIG. 3 is a diagram illustrating a rear perspective view of a toothbrush in accordance with the present principles.

Referring now to FIG. 3, a rear perspective view of a toothbrush is illustratively depicted in accordance with one embodiment of the present principles. This embodiment may include the entire toothbrush 85 with a handle 90, a head 95, and micro suction tape 100. The parts of the toothbrush 85 may be modular elements of an assembled design that can be disassembled or they may be elements of a fused, single body toothbrush that cannot be disassembled or a toothbrush that may be disassembled with or without tools.

The micro-suction tape 100 may be a soft, flexible tape that, when pressed against a smooth flat surface, creates a plurality of small, air-tight vacuums along its entire surface that are sealed with the soft tape material. These sealed, vacuumed indentations are resilient to removal because the soft tape material creates an air-tight seal around the vacuums. The micro-suction tape is particularly effective on very smooth and flat surfaces that enable a more secure air-tight seal around the vacuums. In the bathroom, the smoothest and flattest surfaces are commonly the bathroom mirror and tile walls. These surfaces (e.g., mirror, tile walls, etc.) enable the toothbrush 85 to be conveniently mounted to a variety of materials and places in a typical bathroom.

By including this mounting function, the micro suction tape 100 may enable a reduction in clutter on the sink and counter areas, which enables the user to easily organize his/her bathroom peripherals and therefore increases the effective amount of storage space in the bathroom. Additionally, by mounting the toothbrush on a vertical surface, the brush's bristles are separated from surfaces like the sink and counter that could contaminate the brush's bristles with germs and bacteria and make the brush less hygienic for use.

Figure 4:
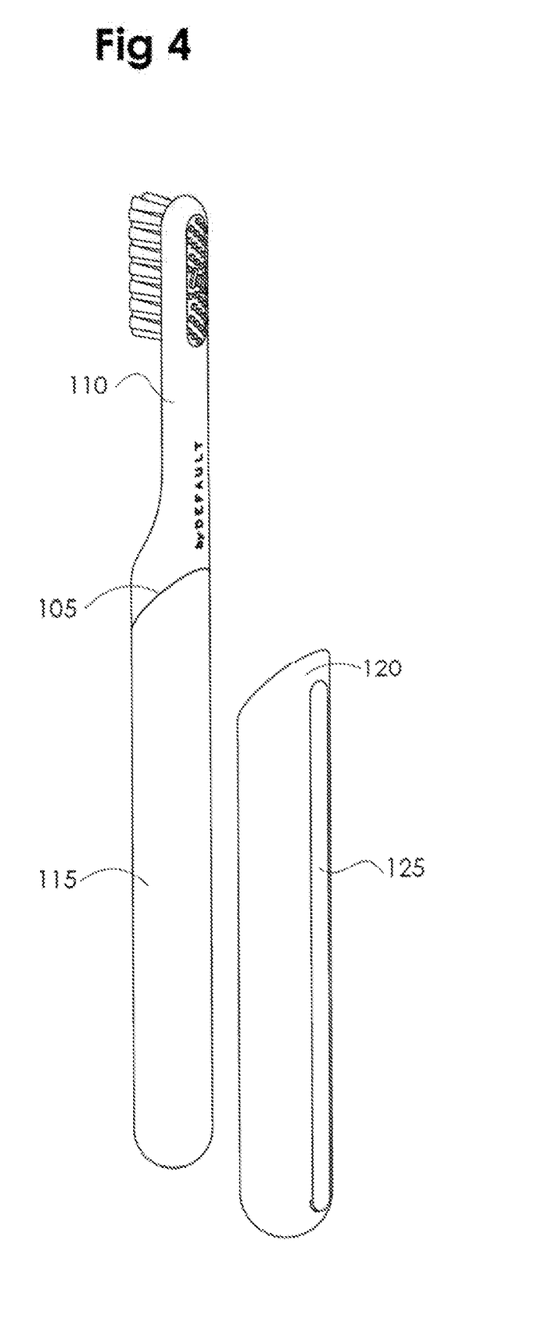
FIG. 4 is a diagram illustrating a rear perspective view of a toothbrush including a travel cap in accordance with the present principles.

Referring now to FIG. 4, a rear perspective view of a toothbrush including a travel cap is illustratively depicted in accordance with the present principles. In one embodiment, a toothbrush 105 includes a head 110, a handle 115, and a travel cap 120. The travel cap 120 may include micro-suction tape 125, which may enable mounting to various surfaces. The micro-suction tape 125 enables mounting of the toothbrush 105 to any flat, smooth surface, and the toothbrush 105 may be removed from the travel cap 120 without detaching the travel cap 120 from a surface (e.g., a mirror, tile wall, etc.) to access the toothbrush 105.

In one embodiment, the toothbrush 105 may be stored after use by simply dropping the toothbrush 105 into the mounted travel cap 120 without requiring removal of the travel cap 120 from the surface to which it is mounted. It is noted that the travel cap 120 may also be removed from the surface to which it is mounted, and re-mounted to another surface. It is noted that the travel cap 120 is also useful as a cap to use with the toothbrush 105 while traveling to protect the toothbrush 105 from germs, bacteria, environmental contaminants in luggage, etc.

Figure 5:
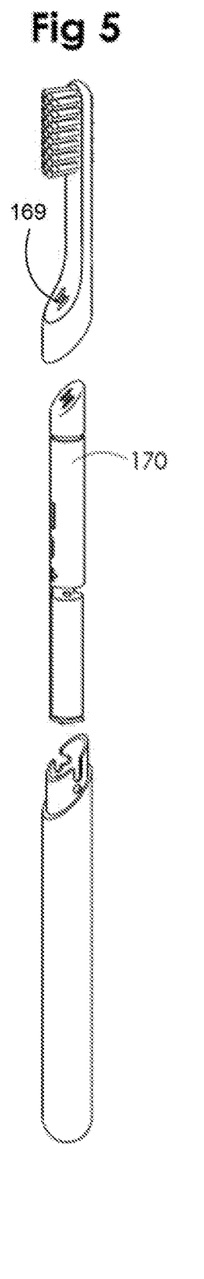
FIG. 5 is a diagram illustrating an exploded view of a toothbrush in accordance with the present principles.

Referring now to FIG. 5, a diagram illustrating an exploded view of a toothbrush is illustratively depicted in accordance with the present principles. In one embodiment, a capsule 170 which may be placed inside a toothbrush, and contains a motor assembly is illustratively shown according to the present principles. A button (e.g., logo button) 169 may be included on the head portion (e.g., replaceable head portion), and may be positioned anywhere on the head portion (e.g., front, top-front, bottom-front, rear, etc.) according to various embodiments of the present principles.

Figure 6:
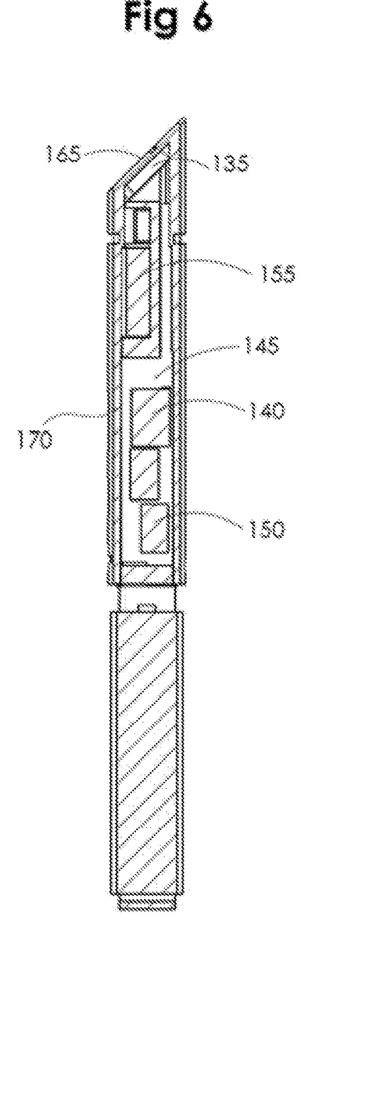
FIG. 6 is a diagram illustrating a cross sectional view of an electric motor capsule included within a toothbrush in accordance with the present principles.

Referring now to FIG. 6, a diagram illustrating a cross sectional view of an electric motor capsule 170 included within a toothbrush is illustratively depicted in accordance with the present principles. In one embodiment, an electric motor 155 is kept separated from any contaminants (e.g., toothpaste) and conducting substances (e.g., water) that may, for example, short out the electric motor's 155 wiring and therefore render it dysfunctional. In one embodiment, the electric motor 155 is kept separated from contaminants and conducting substances by enabling activation of the electric motor 155 using a non-mechanical switch controlled by a microcontroller 140. The microcontroller 140 may change modes or turn the electric motor 155 on or off based on how the microcontroller 140 has been programmed to react to one or more connected sensors.

In one embodiment, one of the connected sensors may be a capacitive sensor 135 that may detect the proximity of, for example, a finger of a user through its capacitance. Once the microcontroller 140 detects a preset level of capacitance using the capacitive sensor 135, the microcontroller 140 may activate, deactivate, or change the mode of the electric motor 155. As the capacitive sensor 135 does not need to be in direct contact with the finger of a user, all of the electronics may be safely sealed behind impermeable layers of plastic 165. By sealing the electronic sensors and motors behind an impermeable layer of plastic 165 (e.g., a single plastic wall) rather than a multi-part assembly (e.g., as employed for mechanical switches), the present principles enable excellent reliability during use in a wet environment (e.g., bathroom, shower, etc.) as moisture and other contaminants are not able to enter the electric motor capsule 170.

In one embodiment, the electric motor capsule 170 may include an accelerometer 150 in a printed circuit board (PCB) assembly 145. The accelerometer 150 may detect motion of a toothbrush, and may send the motion information to the microcontroller 140 as, for example, a constant stream of information. The microcontroller 140 may be programmed to activate the electric motor 155, or to change modes once the accelerometer 150 detects sufficient motion (e.g., a motion similar to that of brushing teeth), thereby enabling the toothbrush to be motion activated (e.g., without requiring the use of a mechanical switch), and simplifying actions of a user for activating the toothbrush for use.

It is noted that a motion-activated toothbrush according to the present principles enables a user to simply begins brushing their teeth, and the electric motor 150 in the toothbrush may automatically turn on to increase the effectiveness of the brushing action. Using either a touch based sensor or accelerometer to activate the toothbrush enables all of the electronics to be housed in a single interior unit. By combining the electric motor 155 and all electric parts in a removable capsule 170, the electric motor 155 and switches may be an optional, removable element of the toothbrush assembly. Since the electric motor capsule 170, including the electric motor 155 are removable, the electric motor capsule 170 may be produced, assembled, and purchased separately from the rest of the toothbrush. This is advantageous because some users may prefer a non-electric toothbrush, prefer a more inexpensive toothbrush, and/or prefer a toothbrush that may be electric (e.g., with the motor capsule 170 installed) or non-electric (e.g., with the motor capsule 170 removed), depending on the current preference of the user.

Figure 7:
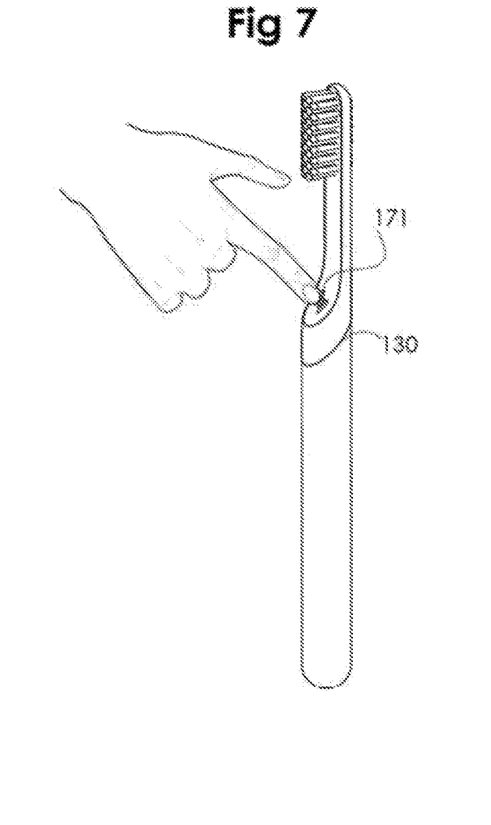
FIG. 7 is a diagram illustrating a method of operation of a toothbrush in accordance with the present principles.

Referring now to FIG. 7, with continued reference to FIG. 6, a diagram illustrating a method of operation of a toothbrush is illustratively depicted in accordance with the present principles. In one embodiment, a user may use their finger to press on the outside of a plastic capsule surface 171 to activate a capacitive sensor inside an electric motor capsule 170 inside a toothbrush 130 according to the present principles. It is noted that the design of the toothbrush 130 according to one embodiment simplifies the exterior of the toothbrush 130 by reducing parts and part lines through which water or other contaminants could contaminate the interior electrical assembly of the toothbrush 130, and render it dysfunctional. Furthermore, by reducing and simplifying the exterior parts of the toothbrush 130, the toothbrush 130 may be easily modified, disassembled, reassembled, and/or customized using, for example, casting, CNC, 3D printing, or other production means.

Figure 8:
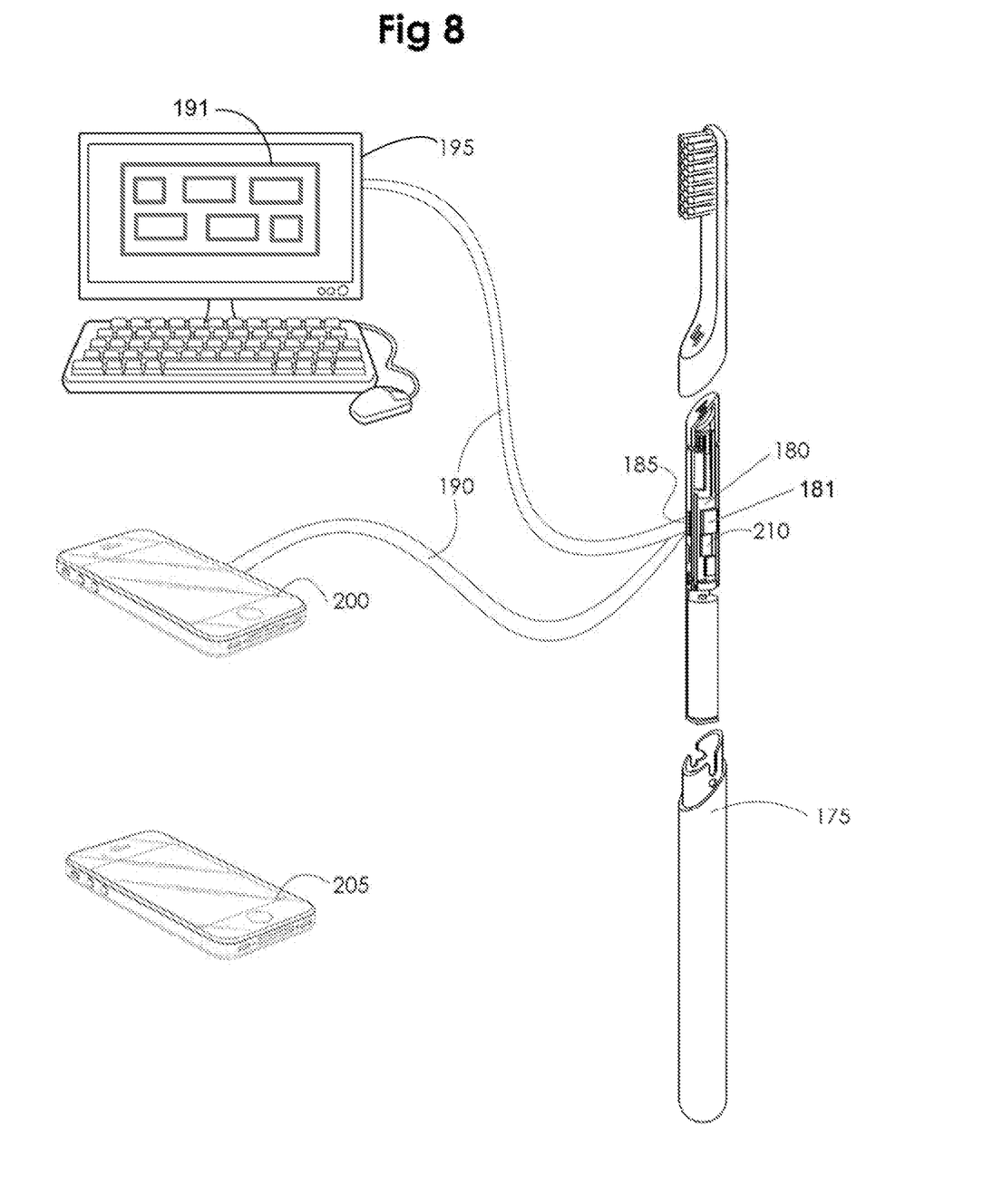
FIG. 8 is a diagram illustrating a schematic view of the connectivity systems of a toothbrush to other systems in accordance with the present principles.

Referring now to FIG. 8, a diagram illustrating a schematic view of the connectivity systems of a toothbrush to other systems is illustratively depicted in accordance with the present principles. In one embodiment, a toothbrush 175 including a plurality of physical and wireless connections to computing devices is shown. The toothbrush 175 is depicted in a disassembled state to reveal a motor assembly 180 in a section view, and a Micro-Universal Serial Bus (USB) slot 185 may be included in the motor assembly 180. A computer 195 or phone 200 may be connected to the toothbrush 175 using one or more cables (e.g., USB cable), and the modes of operation may be manipulated using a graphical user interface (GUI) 191 on a computer 195, cell phone 200, 205, or other computing device.

In one embodiment, the GUI 191 may include a plurality of modules configured to adjust, for example, the speed of the motor, the timing of interval reminder pulses, the length of time of operation before an automatic cutoff, etc., and may be accessed using a computing product (e.g., computer, cell phone, tablet, etc.) which includes a non-transitory computer readable storage medium for storing user preferences and input data. After adjusting options using the GUI 191 of a computer 195 or phone 200, 205, the altered mode of operation of the toothbrush 175 may be saved to the internal memory of a microcontroller 181 inside the motor assembly 180.

In one embodiment, after the toothbrush 175 is disconnected from a secondary computing device 195, 200, 205, the new default behavior of the toothbrush 175 will be to exhibit the newly set motor RPM speed, reminder intervals, automatically timed cut off, and other interaction behaviors, as designated using the GUI 191. It is noted that an advantage of redefining the toothbrush's mode of operation is to more wholly adjust the toothbrush to a particular user's preferences and to create a better brushing experience. Some users may prefer a high RPM for extra strong vibration because, for example, they find their teeth particularly difficult to clean. Other users may prefer a less intense vibration because, for example, they have sensitive gums which could feel discomfort or be injured by a strong vibration.

Adjusting the motor's RPM speed may enable the preferred amount of vibratory strength to be customized and the preference may be applied during brushing according to the present principles. The same kinds of particular preferences for more or less time depending on the user could be expressed in the variable interval reminder timing or the variable automatic cut-off time. Furthermore, the means of activating the toothbrush can also be switched, using the GUI 191, between a touch-based sensor and a motion-based accelerometer sensor depending on the user's preferred mode of operation.

In another embodiment, the motor assembly 180 may be connected to a wireless device 205 (e.g., cell phone, tablet, laptop, etc.) using a wireless data module 210 on the motor assembly 180. An advantage of a wireless connection is that the toothbrush 175 is not required to be disassembled to access the microcontroller and to reprogram the modes of operation of the toothbrush 175. It is noted that a wireless connection according to the present principles may be any sort of wireless connection (e.g., Bluetooth, Wi-Fi Ratio, etc.) that enables devices to communicate with other devices.

Figure 9:
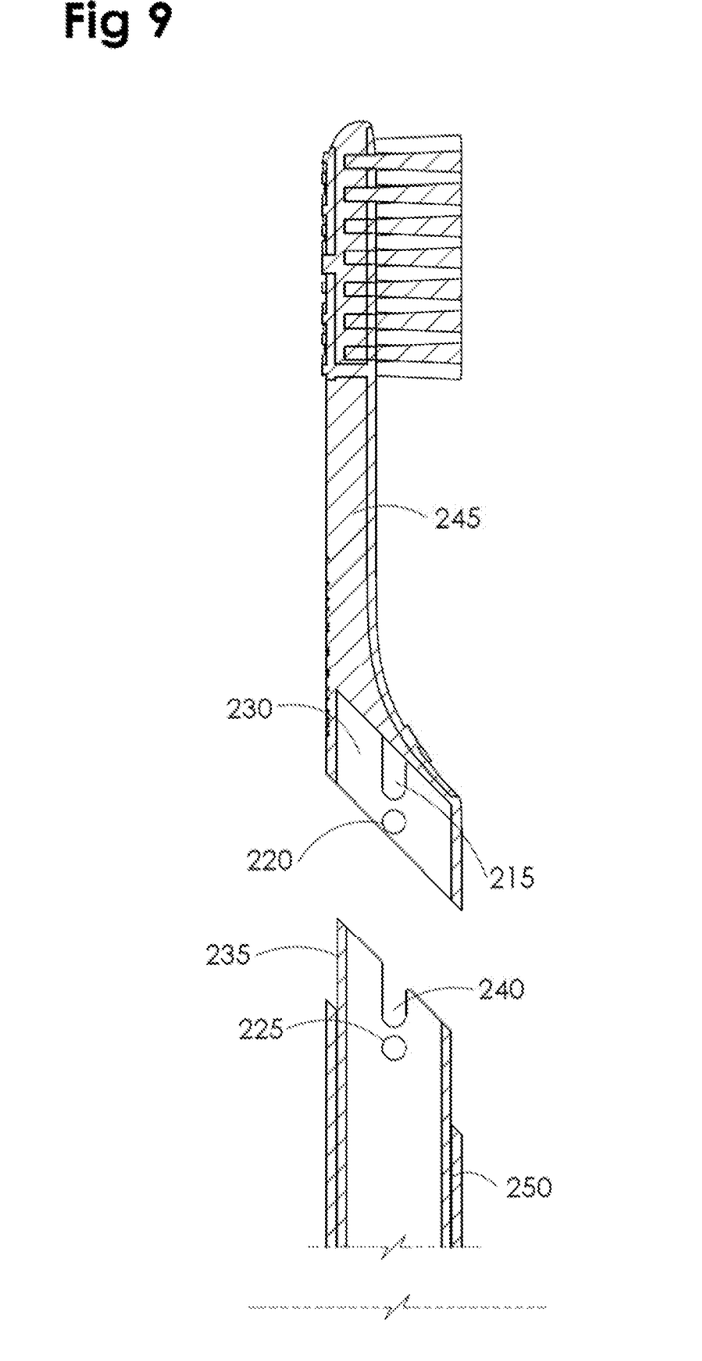
FIG. 9 is a diagram illustrating a cross-section of a locking mechanism of a toothbrush in accordance with the present principles.

Referring now to FIG. 9, a diagram illustrating a cross-section of a locking mechanism of a toothbrush is illustratively depicted in accordance with the present principles. In one embodiment, a handle 235 may protrude out from the outer skin 250, and may include a slot 240 and an aperture 225. The toothbrush head 245 may include an open receiving end 230 that may correspond in shape with the top portion of a handle 235 such that the two may be joined together in a mating fashion.

In one embodiment, a post 220 and a notch 215, sized according to the respective aperture 225, and a slot 240 may be included and positioned on an interior wall of a receiving opening 230. When the receiving opening 230 is placed over the top of the handle 235, the post 220 may be initially guided into slot 240, and when it reaches the bottom of the slot it may "click" over and engage an aperture 225. While a post 220 slides into a slot 240, a notch 215 will engage the top of the slot and thereby prevent incorrect coupling of the head 245 with the handle 235.

Figure 10:
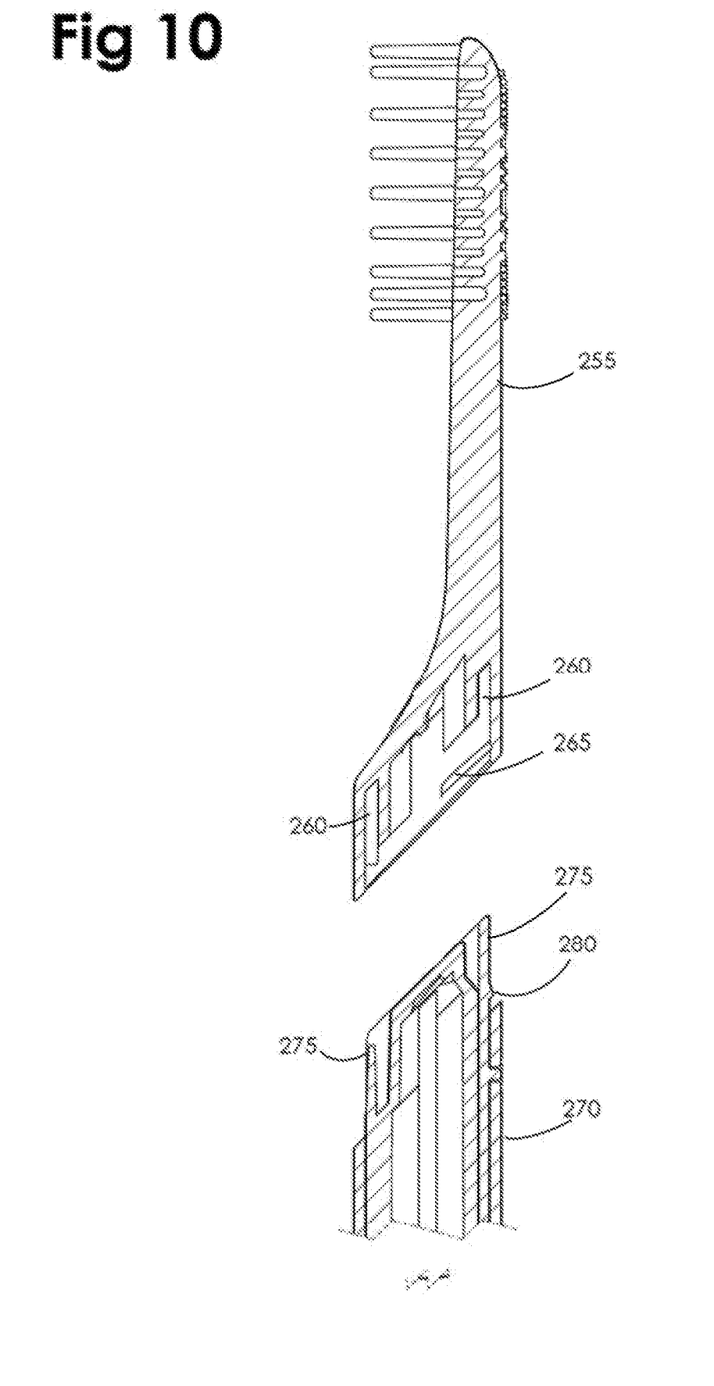
FIG. 10 is a diagram illustrating a cross-section of a locking mechanism of a toothbrush in accordance with the present principles.

Referring now to FIG. 10, a diagram illustrating a cross-section of a locking mechanism of a toothbrush is illustratively depicted in accordance with the present principles. In one embodiment, the toothbrush head 255 may include interlocking surfaces 260 and one or more indentations 265. The toothbrush handle 270 may include interlocking surfaces 275 and one or more ribs 280. When the toothbrush head 255 is connected to the handle 270, the two sets of interlocking surfaces may become fully mated, and rotation of the toothbrush head 255 relative to the toothbrush handle 270 is restricted along every axis. Additionally, when the toothbrush head is inserted onto the handle, its rib 280 may snap into the toothbrush head's indentation. The mating of these two features may resist translational movement along the primary axis of the toothbrush handle 270 so that the toothbrush head 255 does not become detached while being used to brush a user's teeth. When a sufficient force is exerted against the mated rib 280 and indentations 265, the toothbrush head 255 may be removed and replaced with a different toothbrush head, or the same toothbrush head 255 may be reattached.

Figure 11:
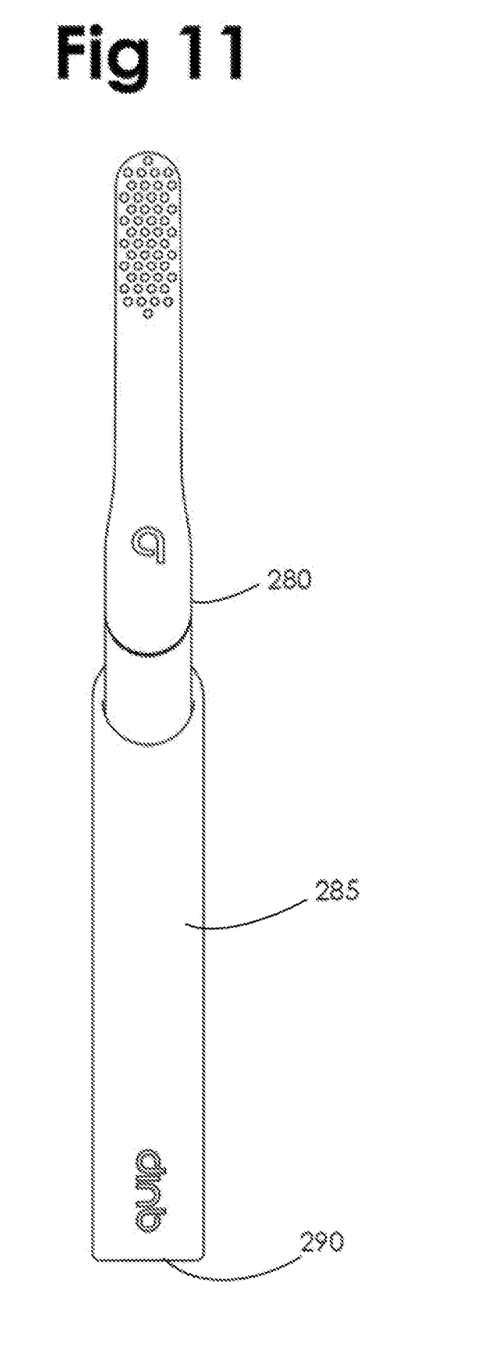
FIG. 11 is a diagram illustrating a perspective view of a toothbrush including a travel cap with a substantially flat bottom surface in accordance with the present principles.

Referring now to FIG. 11, a diagram illustrating a perspective view of a toothbrush 280 including a travel cap 285 with a substantially flat bottom surface 290 is illustratively depicted in accordance with the present principles. In one embodiment, by providing a flat bottom surface 290, the travel cap 285 is able to stand upright on a sink or counter surface without other means of attachment while acting as a storage receptacle for the toothbrush 280. This configuration is advantageous at least because of an improved storage efficiency, and hygienic isolation of the bristles from contaminated surfaces when the toothbrush 280 is standing upright while being stored in a bathroom environment.

It is noted that although the above configuration is illustratively depicted according to the present principles, other sorts of configurations may also be employed according to the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. A toothbrush, comprising:
a head portion including an activation section having an external surface and an internal surface opposite one another;
a handle portion;
a locking mechanism, the head portion releasably securable to the handle portion via engagement of the locking mechanism; and
a capsule including a motor assembly, the capsule disposed within the handle portion with the head portion releasably secured to the handle portion via engagement of the locking mechanism, the capsule removable from the handle portion with the locking mechanism disengaged, the capsule including a fluid impermeable layer of plastic sealing the motor assembly, and the motor assembly activatable within the handle portion through pressing the external surface of the activation section of the head portion.

2. The toothbrush of claim 1, further comprising a skin configured to fit around the handle portion, the skin removable from the handle portion.

3. The toothbrush of claim 2, wherein the skin is re-attachable to the handle portion after being removed.

4. The toothbrush of claim 1, further comprising micro suction tape disposed on the handle portion.

5. The toothbrush of claim 1, wherein the handle portion includes one or more ribs, the head portion includes one or more indentations, and the head portion is releasably securable to the handle portion via engagement of the one or more ribs to the one or more indentations.

6. The toothbrush of claim 1, wherein the motor assembly includes a capacitive sensor, and pressing the external surface the activation section of the head portion is detectable by the capacitive sensor.

* * * * *